US009436523B1

(12) United States Patent
Gibson et al.

(10) Patent No.: US 9,436,523 B1
(45) Date of Patent: Sep. 6, 2016

(54) HOLISTIC NON-INVASIVE EVALUATION OF AN ASYNCHRONOUS DISTRIBUTED SOFTWARE PROCESS

(71) Applicant: CA, Inc., Islandia, NY (US)

(72) Inventors: Grant A Gibson, Clarksville, MD (US); Eitan Hadar, Nesher (IL)

(73) Assignee: CA, Inc., New York, NY (US)

( * ) Notice: Subject to any disclaimer, the term of this patent is extended or adjusted under 35 U.S.C. 154(b) by 195 days.

(21) Appl. No.: 13/788,567

(22) Filed: Mar. 7, 2013

(51) Int. Cl.
G06F 9/46 (2006.01)
G06F 9/54 (2006.01)

(52) U.S. Cl.
CPC ...................................... G06F 9/54 (2013.01)

(58) Field of Classification Search
USPC .......................................................... 718/102
See application file for complete search history.

(56) References Cited

U.S. PATENT DOCUMENTS

| 5,673,390 A * | 9/1997 | Mueller ........................... 714/57 |
| 6,971,096 B1 * | 11/2005 | Ankireddipally ..... G06F 9/5038 707/999.1 |
| 8,694,163 B2 * | 4/2014 | Brzezowski .................. 700/275 |
| 2005/0138081 A1 * | 6/2005 | Alshab et al. ................. 707/200 |
| 2013/0086591 A1 * | 4/2013 | Haven ........................... 718/102 |

* cited by examiner

Primary Examiner — Emerson Puente
Assistant Examiner — Steven Do
(74) Attorney, Agent, or Firm — Myers Bigel & Sibley, P.A.

(57) ABSTRACT

Provided are methods of determining success of a software process that includes multiple process operations, ones of which use multiple programs for execution. Such methods may include receiving a request to perform the software process. The request includes a process map that defines the process operations corresponding to the software process and process operation success criteria to determine the success or failure of ones of the process operations. The process operations are scheduled to be performed serial to one another according to the process map. Data corresponding to results of ones of the process operations is collected. Results of the data are evaluated to define whether the ones of the process programs executed successfully based on the process operation success criteria to determine if the software process is a success or a failure.

27 Claims, 7 Drawing Sheets

US 9,436,523 B1

HOLISTIC NON-INVASIVE EVALUATION OF AN ASYNCHRONOUS DISTRIBUTED SOFTWARE PROCESS

BACKGROUND

The installation and configuration of software applications and systems, such as those found in enterprise systems and distributed real-time systems may require multiple different processes which each may include executing a number of programs in an asynchronous and distributed manner. As such it may often be necessary to be able to determine whether or not programs complete execution successfully.

Existing programs may provide a descriptor number corresponding to the results of the program. The descriptor number may be an integer value within some predefined range. However, the semantics of the descriptor number may not be universally defined and may vary from one program to another.

Additionally, many programs also write messages to further describe results of the program. A true evaluation of the success or failure of the program may often depend on the content of the messages written by the program. However, message logs used by programs may vary in location, structure and content from one program to another.

Yet further, determining an overall success of the software application or system installation or configuration to be further complicated by the asynchronous and distributed manner in which the different programs and/or processes may be executed.

BRIEF SUMMARY

It is noted that aspects described with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present inventive concept, and be protected by the accompanying claims.

Some embodiments are directed to methods of determining success of a software process that includes multiple process operations, ones of the process operations using multiple programs for execution. Methods according some embodiments include receiving a request to perform the software process. The request may include a process map that defines the process operations corresponding to the software process and process operation success criteria to determine the success or failure of ones of the process operations. Methods may further include scheduling the process operations to be performed serial to one another according to the process map, collecting data corresponding to results of ones of the process operations, and evaluating results of the data to define whether the ones of the process programs executed successfully based on the process operation success criteria to determine if the software process is a success or a failure.

In some embodiments, the process map further includes software process success criteria that defines at least one combination of successful ones of the process operations to determine that the software application is a success. Some embodiments provide that ones of the programs are executed on multiple different distributed network nodes. In some embodiments, the process map identifies the ones of the programs, defines success criteria corresponding to the software process, the success criteria including a combination of successful ones of the process operations that are evaluated as the success criteria corresponding to the software process.

In some embodiments, one of the programs in a corresponding process operation is executed during a portion of execution of another one of the programs in the corresponding process operation.

Some embodiments provide that collecting data corresponding to results of ones of the process operations includes determining program success of the programs corresponding to ones of the process operations. In some embodiments, determining program success of ones of the programs of the plurality of programs includes collecting a descriptor number corresponding to the program. The descriptor number may be generated by the program after execution of the program is complete. Whether the program successfully executed or not may be determined using the descriptor number.

Some embodiments provide that determining program success of ones of the plurality of programs includes monitoring, while the program is executing, a message log that is a repository for messages generated by the program, identifying, using the message log, a message that is significant to determining program success and determining, using the descriptor number and the message that is significant to determining program success, whether the program successfully executed. In some embodiments, multiple different messages may be significant to determining program success. In some embodiments, each of the messages includes a severity code that corresponds to a content of the message. Identifying the message that is significant to determining program success may be based on the severity code. Some embodiments provide that determining program success of ones of the programs may include evaluating one or more success conditions that correspond to the program to determine if any one of the success conditions is satisfied. If any of the success conditions is satisfied, then the program execution is successful.

Some embodiments further include serially executing ones of the process operations. Ones of the process operations may be selected as a subsequent process operation as determined by whether a currently executing process operation is successful or not. In some embodiments, the process map includes an identity of which process operation is the subsequent operation based on whether the currently executing process operation is successful. Some embodiments provide that the software process is complete when no subsequent process operations are identified.

Some embodiments of the present disclosure are directed to computer program product that includes a computer readable storage medium having computer readable program code embodied in the medium. The computer code may include computer readable code to perform operations as described herein.

Some embodiments of the present disclosure are directed to a computer system that includes at least one processor and at least one memory coupled to the processor. The at least one memory may include computer readable program code embodied therein that, when executed by the at least one processor causes the at least one processor to perform operations as described herein.

It is noted that aspects of the disclosure described with respect to one embodiment, may be incorporated in a different embodiment although not specifically described relative thereto. That is, all embodiments and/or features of any embodiment can be combined in any way and/or combination. These and other objects and/or aspects of the present inventive concept are explained in detail in the specification set forth below.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
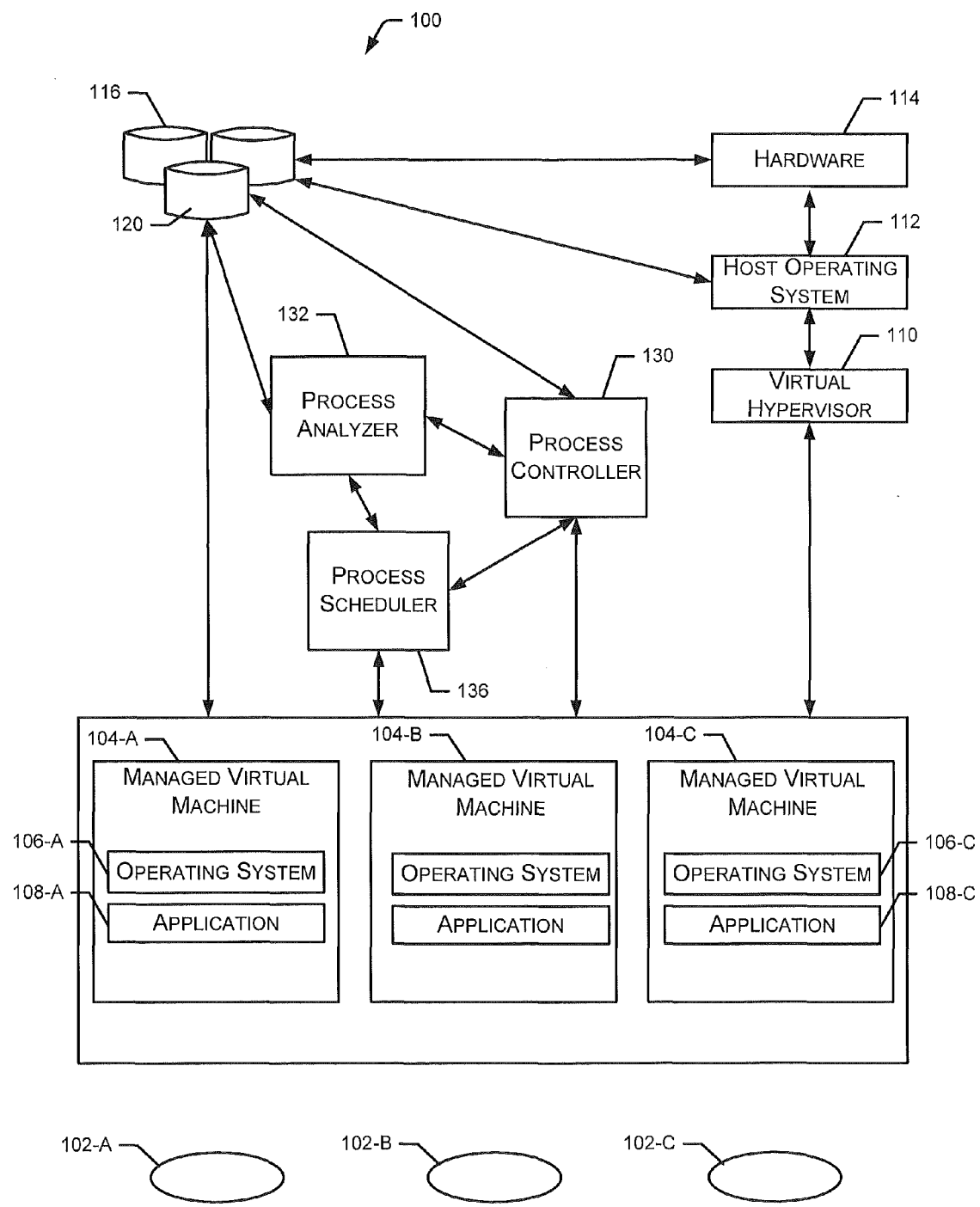
FIG. 1 is a block diagram of a computing system that supports a virtual operating environment according to some embodiments of the present inventive subject matter.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As discussed herein, external evaluation systems, methods and computer program products may evaluate the success or failure of a software process, where the software process includes the execution of a number of programs in an asynchronous and distributed manner, without creating invasive program change in the code, behavior and/or structure of existing programs. As used herein, a software process may include a computer program that installs and/or configures an application and/or suite of applications that may be used via a computer network. A software process as defined herein may define a series of serially executed process operations. In some embodiments, each of the process operations may cause the execution of multiple computer programs, ones of which may be executed in parallel and/or on different computing devices. Embodiments disclosed herein may holistically consider the success or failure of the distributed software process by examining all of the ingredients therein, which may include process operations and/or programs. The ingredients may be involved in the execution of a business process, a State Machine, or situational application context in order to determine the success or failure of the distributed software process execution.

Evaluation techniques may include external modifications for more comprehensive cases by tailoring for use with different programs, blending success and failure semantics from underlying individual systems, technological restrictions and/or compatibility, and/or physical location. Additionally, some embodiments provide that the root cause and origin of a failure in a distributed system may be detected by harvesting repeated failure patterns, such as by warehousing distributed process success behavior logs. Further, messages from presumably disjoint systems may be collected and investigated as a single process. Yet further, methods, systems, and computer program products disclosed herein may be applicable to existing legacy systems without the need to access centralized process management/workflow systems.

Some embodiments may be tailored for use with different programs used in different ones of the software processes, regardless of the semantics of the descriptor number, message logs used by the programs, and the structure and/or content of the messages generated and/or written by the programs. The programs may be executed in an asynchronous and distributed manner and the results therefrom may be correlated and consolidated into a unified representation of the success or failure of the software process.

Reference is now made to FIG. 1, which is a block diagram of a computing system that supports a virtual operating environment according to some embodiments of the present inventive subject matter. The computer system 100 generally hosts and manages one or more virtual machines 104 (hereafter managed virtual machine, or managed machine), each of which runs a guest operating system 106 and application 108. The computing needs of users 102 (e.g., humans and/or other virtual/non-virtual machines) drive the functionality of the virtual machines 104. A virtual hypervisor 110 can provide an interface between the virtual machines 104 and a host operating system 112 and allow multiple guest operating systems 106 and associated applications 108 to run concurrently. The host operating system 112 handles the operations of a hardware platform 114 capable of implementing virtual machines 104. A data storage space 116 may be accessed by the host operating system 112 and is connected to the hardware platform 114.

The hardware platform 114 generally refers to any computer system capable of implementing virtual machines 104, which may include, without limitation, a mainframe computer platform, personal computer, mobile computer (e.g., tablet computer), server, wireless communication terminal (e.g., cellular data terminal), or any other appropriate program code processing hardware. The hardware platform 114 may include computer resources such as a processing circuit(s) (e.g., central processing unit, CPU); networking controllers; communication controllers; a display unit; a program and data storage device; memory controllers; input devices (such as a keyboard, a mouse, etc.) and output devices such as printers. The processing circuit(s) is configured to execute computer program code from memory device(s), described below as a computer readable storage medium, to perform at least some of the operations and methods described herein, and may be any conventional processor circuit(s), such as the AMD Athlon™ 64, or Intel® Core™ Duo.

The hardware platform 114 may be further connected to the data storage space 116 through serial or parallel connections. The data storage space 116 may be any suitable device capable of storing computer-readable data and program code, and it may include logic in the form of disk drives, random access memory (RAM), or read only memory (ROM), removable media, or any other suitable memory component. According to the illustrated embodiment, the host operating system 112 functionally interconnects the hardware platform 114 and the users 102 and is responsible for the management and coordination of activities and the sharing of the computer resources.

Although some embodiments of the computer system 100 can be configured to operate as a computer server, the computer system 100 is not limited thereto and can be configured to provide other functionality, such as data processing, communications routing, etc.

Besides acting as a host for computing applications that run on the hardware platform 114, the host operating system 112 may operate at the highest priority level in the system 100, executing instructions associated with the hardware platform 114, and it may have exclusive privileged access to the hardware platform 114. The priority and privileged access of hardware resources affords the host operating system 112 exclusive control over resources and instructions, and may preclude interference with the execution of different application programs or the operating system. The host operating system 112 can create an environment for implementing a virtual machine, hosting the "guest" virtual machine. One host operating system 112 is capable of implementing multiple isolated virtual machines simultaneously.

A virtual hypervisor 110 (which may also be known as a virtual machine monitor or VMM) may run on the host operating system 112 and may provide an interface between the virtual machine 104 and the hardware platform 114 through the host operating system 112. The virtual hypervisor 110 virtualizes the computer system resources and facilitates the operation of the virtual machines 104. The hypervisor 110 may provide the illusion of operating at the highest priority level to the guest operating system 106. However, the virtual hypervisor 110 can map the guest operating system's priority level to a priority level lower than the top most priority level. As a result, the virtual hypervisor 110 can intercept the guest operating system 106, and execute instructions that require virtualization assistance. Alternatively, the virtual hypervisor 110 may emulate or actually execute the instructions on behalf of the guest operating system 106. Software steps permitting indirect interaction between the guest operating system 106 and the physical hardware platform 114 can also be performed by the virtual hypervisor 110.

When operating in a virtualized environment, the virtual machines 104 present a virtualized environment to the guest operating systems 106, which in turn provide an operating environment for applications 108 and other software constructs.

Applications 108 that are implemented on the virtual machines 104 may be configured to access one or more data sources in accordance with the functions thereof. As discussed herein by way of example, a data source may be a file, however, the disclosure is not so limited. For example, database applications and/or applications that operate, at least in part, using data sources such as database files, may rely on access to one or more database files to perform the requisite operations. In some embodiments, such access may further include one or more settings that determine or identify a portion, format, location, path, version or other attribute of the file being accessed. For example, an access request corresponding to a database file may include query terms, among others. In some embodiments, an access request corresponding to a database file may be directed to a database 120 that may be included in or provided in addition to the data storage space 116.

In some embodiments, a process controller 130 may provide a framework under which processes are performed and the success or failure of such processes may be evaluated. In some embodiments, the process controller 130 may accept requests to perform a software process. The request software process may involve the execution of a number of programs in an asynchronous and or distributed manner. Some embodiments provide that each request they specify, include and/or define a process map.

A process map may identify the process operations, the sequence in which the process operations are to be scheduled, the identification of programs to be executed as part of each process operation, and the criteria used to evaluate the success or failure of the individual process operations and/or the software process as a whole. In some embodiments the process map may specify, for each of the programs to be executed, the identity of a system on which the program is to be executed, the name and location of the program, program parameters such as input parameters, an identity of message logs used by the program, an identity of the message catalog associated with the program, and/or success conditions used to evaluate the success or failure of the program execution.

Process operations, each of which may be performed serially, may define one or more programs to execute as part of the process operation. In some embodiments, programs corresponding to a process operation may execute in parallel and may execute on different systems, platforms, devices and/or environments. As each program to be executed as part of a process operation completes, the process controller 130 may receive a response message that includes results from the program execution including, the determination of whether or not the program completed execution successfully.

In some embodiments, a process scheduler 136 may schedule process operations of the software process and initiate the execution of programs that are included and/or executed for the software process. Although discussed as a separate component, module and/or operation from the process controller 130, the process scheduler 136 may also be a component of the process controller 130. For each program to be executed as part of the process operation being scheduled, the process scheduler 136 may send a request to the system on which the program is to be executed. The system accepts the request, initiates the execution of the specified program, collects data about the program execution, evaluates the success or failure of the program execution, and/or sends response back to the process controller 130 with the description of the results of program execution. Some embodiments provide that the response sent to the process controller 130 includes whether or not the program completed execution successfully.

In some embodiments, a process scheduler 136 may structure the software process into a hierarchy of process operations, which are performed serially. Ones of the process operations may include programs, which may execute in parallel and may execute on different systems to exploit parallelism when available in serial execution when necessary.

A process analyzer 132 may capture and evaluate the results of program execution. Although discussed as a separate component, module and/or operation from the process controller 130, the process analyzer 132 may also be a component of the process controller 130. Each process operation may have success criteria, which are a group of expressions connected by join operators that specify the combination of programs that must complete successfully in order for the process operation to be considered successful. The operation success criteria allows the consideration of results from a combination of programs when evaluating the success or failure of the process operation. Some embodiments provide that the success criteria include multiple different success conditions (combinations of programs that may be considered successful). If any of the success conditions are satisfied then the process operation may be considered successful.

In some embodiments, the process map may include software process success criteria. The software process success criteria may be used by the process analyzer 132 to determine if the software process is successful. The software process success criteria may include a group of expressions connected by operators to specify one or more combinations of process operations that must be completed successfully in order for the software process to be considered successful. The different combinations of process operations may each represent software process success conditions. If any of the software process success conditions is satisfied then the software process may be considered successful. In this manner, the success or failure of the software process as a whole may be evaluated by considering the results from combinations of the process operations.

In some embodiments, evaluating the success or failure of a process operation may be performed by evaluating the process operation success criteria when a program completes execution. In some embodiments, evaluation of process operation success criteria may yield a Boolean result. Because more than one program may be defined to execute as part of a process operation and the programs of the process operation may execute in parallel, the evaluation result may be indeterminate. In this case no action may be taken until evaluation of the success criteria yields a conclusive result.

Some embodiments provide that if the result from the evaluation of the process operation success criteria is true, then the process operation may be considered successful. In some embodiments, the process operation definition may specify the next process operation to schedule when a process operation is successful. If the results from the evaluation of the process operation success criteria is false then the process operation may be considered unsuccessful. Some embodiments provide that the process operation definition may specify the next process operation to schedule when a process operation is unsuccessful.

In some embodiments, the software process may be considered complete when the next process operation to schedule is undefined. As such, when the next process operation to schedule is undefined and the software process is considered complete, the software process success criteria may be evaluated to determine the success or failure of the software process. If the result from the evaluation of the software process success criteria is true, then the software process may be considered successful. Otherwise, the software process may be considered unsuccessful.

Figure 2:
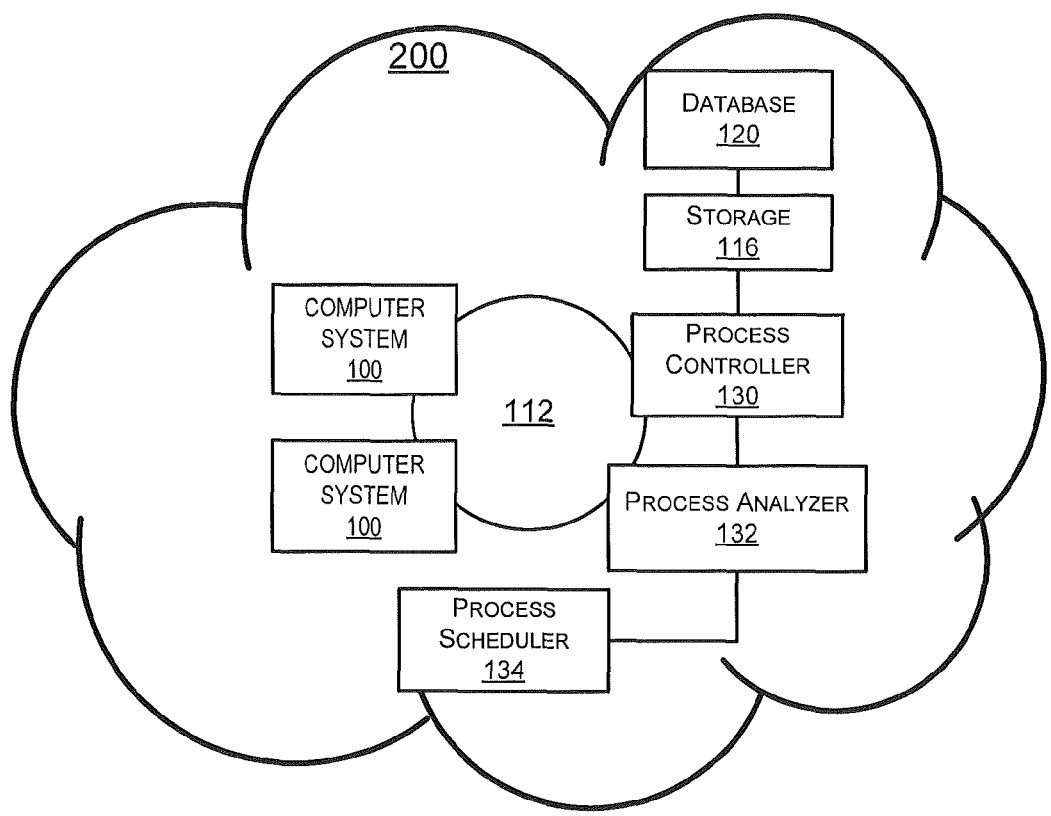
FIG. 2 illustrates a virtual computing environment according to some embodiments of the present inventive subject matter.

Reference is now made to FIG. 2, which illustrates a virtual computing environment according to some embodiments of the present inventive subject matter. A virtual computing environment 200 (referred to generally as cloud 200) may include one or more computer systems 100 (referred to as server systems) that may include one or more electronic computing devices operable to receive, transmit, process, and store data. For example, the servers in the cloud 200 may include one or more general-purpose personal computers, workstations, server computers, server pools, or any other suitable devices. In certain embodiments, the cloud 200 may include a web server. In short, the cloud 200 may include any suitable combination of software, firmware, and hardware.

The plurality of server systems 100 may be communicatively coupled via a network 112. The network 112 facilitates wireless and/or wireline communication, and may communicate using, for example, IP packets, Frame Relay frames, Asynchronous Transfer Mode (ATM) cells, voice, video, data, and other suitable information between network addresses. The network 112 may include one or more local area networks (LANs), radio access networks (RANs), metropolitan area networks (MANs), wide area networks (WANs), all or a portion of the global computer network known as the Internet, and/or any other communication system or systems at one or more locations. Although referred to herein as "server systems", it will be appreciated that any suitable computing device may be used. A network address may include an alphabetic and/or numerical label assigned to a device in a network. For example, a network address may include an IP address, an IPX address, a network layer address, a MAC address, an X.25/X.21 address, and/or a mount point in a distributed file system, among others.

While FIG. 2 illustrates a physical configuration of servers within a cloud 200, a computer system 100 may include a logical grouping of virtual machines 104 within a virtualization environment in the cloud 200. Although not illustrated herein, the virtual machines 104 in the cloud can be organized and managed in clusters, which may also referred to herein as "grids". A virtualization environment in the cloud 200 may be managed by a single hypervisor 110, or a set of hypervisors 110.

Virtual machines can be deployed in particular virtualization environments and organized to increase the efficiency of operating and/or managing a virtual computing environment. For example, virtual machines may be grouped into clusters in order to provide load balancing across multiple servers.

Virtual machines 104 that are deployed within a virtualization environment may share physical resources within a server 100. For example, virtual machines 104 may share physical data storage 116, a database 120 communication facilities and other resources or services of a server 100. Software applications and/or configurations may be installed and/or implemented by using a process controller 130 that is configured to provide a framework under which software processes are performed and the success or failure of such processes may be evaluated. A process analyzer 132 may capture and evaluate the results of program execution corresponding to the software process. For each program to be executed as part of the process operation being scheduled, the process scheduler 136 may send a request to the system on which the program is to be executed.

Server automation/provisioning tools (also referred to as server deployment tools) may be used to manage virtual machines in a cloud computing environment. For example, server automation/provisioning tools may move virtual machines from one hypervisor to another or from one virtualization environment to the other. These tools may also be used, for example, to deploy, provision, activate, suspend, and otherwise manage the operation of virtual machines. These tools may further be used to implement systems/methods according to some embodiments described herein.

Figure 3:
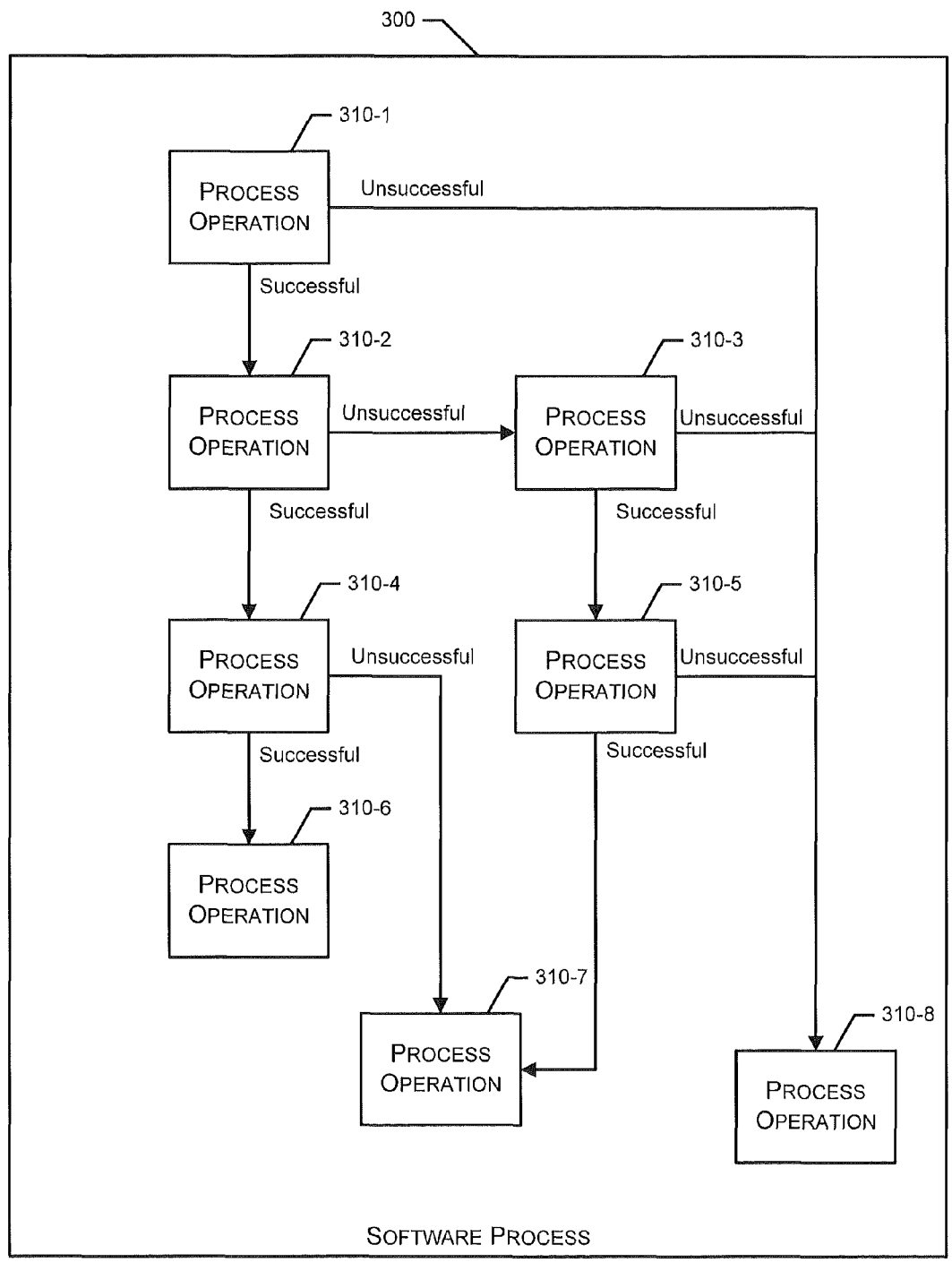
FIG. 3 is a flowchart illustrating operations for performing a software process including multiple process operations according some embodiments of the present inventive subject matter.

Reference is now made to FIG. 3, which is a flowchart illustrating operations for performing a software process including multiple process operations according some embodiments of the present inventive subject matter. According to some embodiments described herein, a software process 300 may be performed via multiple different process operations 310. Some embodiments provide that the different process operations 310 may be performed serially. Each process operation may include and/or be configured to execute multiple different programs. Each of the process operations 310 may be evaluated to determine whether the process operation 310 is successful or unsuccessful.

After a process operation 310 has been evaluated to determine whether the process operation 310 is successful or unsuccessful, an identity of process operation 310 to be performed subsequently may be defined and/or provided. For example, if process operation 310-1 is evaluated to have been performed successfully then process operation 310-2 may be defined as the next process operation 310 to be performed. If process operation 310-1 is evaluated to have been performed unsuccessfully then process operation 310-8 may be defined as the next process operation 310 to be performed. Note that process operation 310-8 does not define any subsequent process operations, which indicates that the software process is complete and may be evaluated based on the software process success criteria.

The software process success criteria may include one or more success conditions that may be defined in terms of combinations of process operations 310 that must be successful for the software process to be evaluated as successful. For example, a first success condition corresponding to the illustrated software process 300 may be that process operations 310-1, 310-2, 310-4 and 310-6 are performed successfully. Similarly, a second success condition corresponding to the illustrated software process 300 may be that process operations 310-1, 310-3 and 310-5 are performed successfully. As discussed above, if either of the success conditions are satisfied then the software process may be evaluated as successful.

Figure 4:
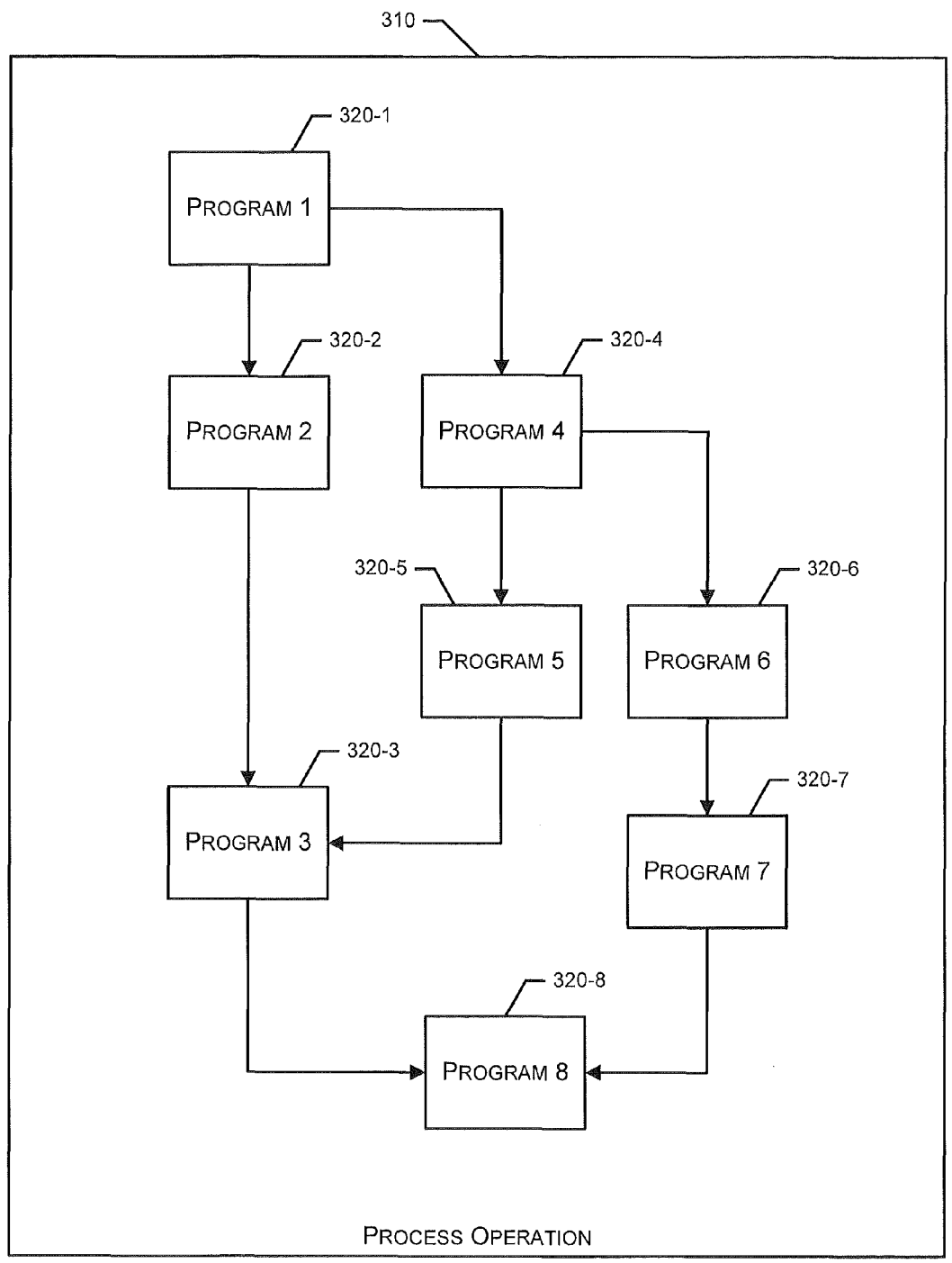
FIG. 4 is a flowchart illustrating programs for performing a process operation according some embodiments of the present inventive subject matter.

Reference is now made to FIG. 4, which is a flowchart illustrating programs for performing a process operation according to some embodiments of the present inventive subject matter. As also noted above, each process operation 310 may be performed by executing multiple different programs 320 that may be executed in parallel and/or on different machines, servers and/or networks among others. In this regard, each process operation 310 may be evaluated for success or failure using process operation success criteria. The process operation success criteria may include one or more success conditions that may be defined in terms of combinations of programs 320 that must be successful for the process operation to be evaluated as successful. The sequence of programs 320 is illustrated for example only and does not suggest that a predetermined sequence of the programs is defined.

As such, the success or failure of each of the programs 320 is evaluated. Since the programs may be executed in an asynchronous and/or distributed manner, an external evaluation system is provided without creating invasive program change in either code, behavior, or structure of existing programs. For example, some embodiments provided herein include external program evaluation for examining success or failure of program execution.

Figure 5:
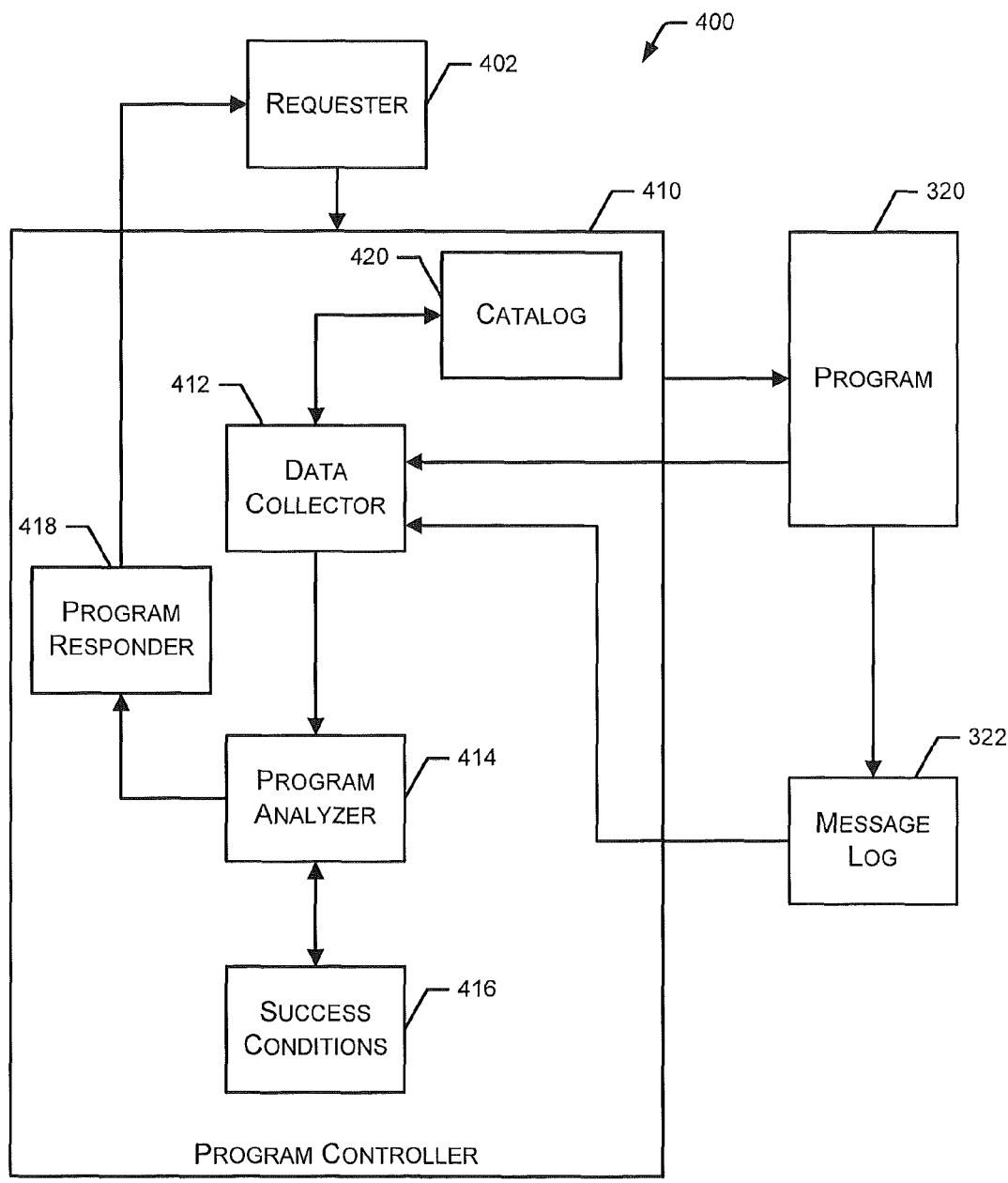
FIG. 5 is a block diagram illustrating a program controller for determining success or failure of a program according to some embodiments of the present inventive subject matter.

Reference is now made to FIG. 5, which is a block diagram illustrating a program controller for determining success or failure of a program according to some embodiments of the present inventive subject matter. Determining the success or failure of the program may include considering both a program descriptor number, which may also be referred to as a return code, and messages written by the program 320 during and/or at the end of execution. The success or failure evaluation may be applied to different programs and/or types of programs, regardless of the semantics of the program descriptor number, the location and/or format of the message logs used by the program, and the structure and content of the messages written by the program. A program controller 410 may provide a framework under which programs are executed, data about the program execution is collected and program results are analyzed.

The program controller 410 may receive a request to execute a program 320 from a requester 402. In some embodiments, each request may include data such as the name and location of the program to execute, program parameters, identification of message logs used by the program, identification of the message catalog associated with the program and/or success conditions used to evaluate the success or failure of program execution. Upon receipt of the request to execute the program 320, the program controller 410 may initiate the execution of the program.

A data collector 412 may collect data corresponding to the program execution. In some embodiments, the data collector 412 may be a subcomponent of the program controller 410, however other embodiments may include a data collector 412 is a module or component that is distinct from the program controller 410. The data collector 412 may examine messages written to one or more message logs 322 by the program 320 during execution. Some embodiments provide that the data collector 412 may also capture the descriptor number (e.g., return code) corresponding to the program 320 being executed.

The message log(s) 322 may be a data set, a file and/or a programming interface that the program 320 writes messages to. In some embodiments, operations described herein use message logs 322 to identify messages written during the execution of the program 320 and that are significant to determining the success or failure of the program 320. In this regard, the data collector 412 may monitor the message log 322 and retrieve messages generated by the program 320.

A catalog 420 may include a message catalog that describes the messages that may be written to a message log 322. In some embodiments, the message catalog 420 may include a list of message entries, each of which identifying one or more messages that may be written to the message log 322 and that may be significant to determining the success or failure of the execution of the program 320.

In some embodiments, message entries in a message catalog 420 may use a message code and/or a segment of text that appears anywhere in the text of the message written to the message log 322 to identify messages that are significant to determining the success or failure of the execution of the program 320. Message entries in the message catalog 420 may include at least one of the message code or the message text segment. Additionally, some embodiments provide that each message entry in the message catalog 420 may also include an associated severity code. A severity code may be associated with each matching entry written into the message log 322. Non-limiting examples of severity codes may include an informational message, a warning message, an error message and/or a severe error message, among others. By associating the severity code with each message written to a message log 322, specific sets of messages may be identified as significant when evaluating the success or failure of the execution of the program 320.

Some embodiments provide that the data collector 412 generates a message result set that is a set of messages upon which evaluation of the success or failure of the program can depend. For example, as the program 320 executes, each message written to the message log 322 may be compared to the message entries in the message catalog 420. Some embodiments provide that those messages that are written to the message log 322 and that match at least one message entry in the message catalog 420 may be collected into the message result set.

A message written to the message log 322 may match a message entry in the message catalog 420 if the message code specified in the message entry in the message catalog 420 equals the message code of the message written to the message log 322. In some embodiments, a message written to the message log 322 may match a message entry in the message catalog 420 if a segment of text specified in the message entry of the message catalog 420 appears anywhere in the text of the message written to the message log 322. Some embodiments provide that wildcard pattern matching may be allowed in the comparison of message codes. In some embodiments, the comparison of message text segments may be case-sensitive and/or case insensitive depending on the message.

Some embodiments provide that if a message that is written to a message log 322 and collected into a message result set matches more than one message entry in the message catalog 420, then a severity code from the first matching message entry in the message catalog 420 may be associated with the message in the message result. In some embodiments, each message collected into the message result set may be a separate entry in the message result set and may include the message code, the complete message text and/or the message severity code from the first matching message entry in the message catalog 420.

After a program 320 completes execution, a program analyzer 414 may examine data collected through the data collector 412 about program execution and determine whether or not the program 320 completed successfully. In some embodiments, the program analyzer 414 may be a subcomponent of the program controller 410, however other embodiments may include a program analyzer 414 that is a module or component that is distinct from the program controller 410. In some embodiments, the program analyzer 414 may evaluate program success criteria, which may include one or more program success conditions 416 to determine the success or failure of program execution. If any one of the program success conditions 416 is satisfied, the program execution may be considered successful. Alternatively, if none of the program success conditions 416 are satisfied then the program execution may be considered unsuccessful.

In some embodiments, a program success condition 416 may specify the combination of program descriptor numbers and/or values that are considered as a successful execution of the program 320. Some embodiments provide that the program success condition 416 may specify and/or define one or more program messages that are considered to evaluate the program execution as successful. The program success conditions 416 may also include ranges of descriptor values in determining the success or failure of program execution. In some embodiments, program success conditions 416 may specify the combination of one or more descriptor numbers and/or ranges thereof and one or more program messages that are considered successful executions of the program 320. In this regard, program success conditions 416 make it possible to consider both the program execution descriptor number and messages written to a message log 322 during the execution of the program 320 evaluating the success or failure of program execution.

In some embodiments, program success conditions 416 each specify a descriptor number and may specify a list of message entries. The list of message entries may specify messages written to the message log 322 during program execution that are either allowable or required in order to satisfy the condition. Message entries in the program success conditions may include message code that specifies codes of allowable and/or required messages, a message text segment that specifies a segment of text that appears anywhere in the message text of allowable and/or required messages, message severity codes the specify the severity code of allowable and/or required messages, and a required indicator that specifies the at least one message matching the program success condition message must've been written to the message log 322 during program execution. Some embodiments provide that message entries in the program success conditions 416 may include message entries that may not be present for successful execution.

When program 320 completes execution, the program success conditions 416 are evaluated to determine the success or failure of the program execution. Some embodiments provide that for a given program success condition 416 to be satisfied two conditions may be met. The first is that the program descriptor number equals a condition descriptor number and/or falls within a condition descriptor number range specified with the program success condition 416. The second is that, if the program success condition 416 specifies a list of message entries, every message result set message entry matches at least one of the success condition message entries. Any program success condition 416 message entry that is defined as a required message entry must match at least one message entry in the message result set for the program execution to be considered successful.

Once the program analyzer 414 evaluates the execution of the program 320 as successful or unsuccessful, a program responder 418 may report the success or failure evaluation to the requester 402.

Figure 6:
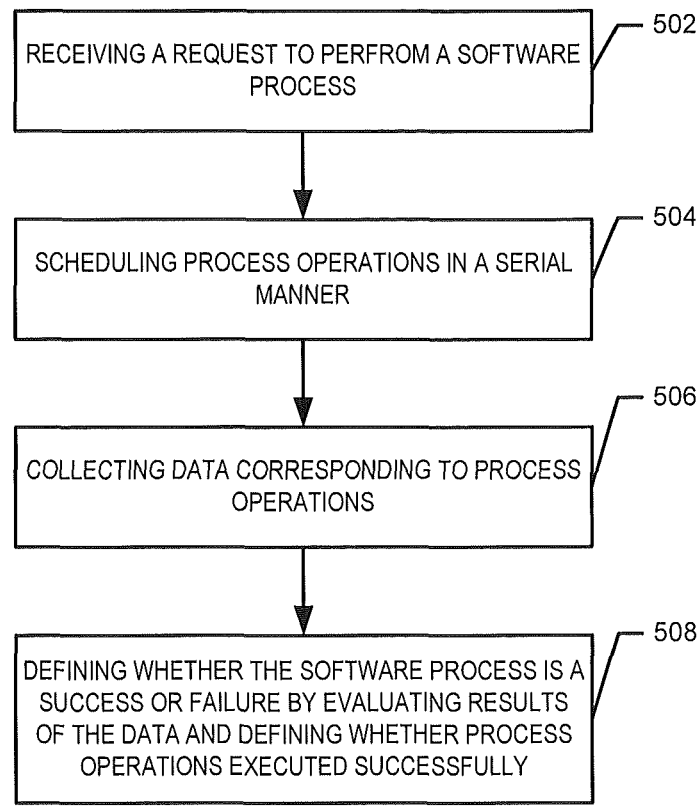
FIG. 6 is a flowchart illustrating operations for systems/methods according to some embodiments of the present inventive subject matter.

Reference is now made to FIG. 6, which is a flowchart illustrating operations for systems/methods according to some embodiments of the present inventive subject matter. Methods of determining success of a software process that includes multiple process operations, ones of which use multiple programs for execution may include receiving a request to perform the software process (block 502). Some embodiments provide that ones of the programs are asynchronously executed on multiple different distributed network nodes. In some embodiments, the request may include a process map that defines the process operations corresponding to the software process.

Some embodiments provide that the process map includes software process success criteria that defines one or more combinations of process operations that are evaluated as successful to determine that the software application is a success. In some embodiments, the process map identifies which of the programs will be executed as part of the software process. Additionally, some embodiments provide that the process map defines success criteria corresponding to the software process. The success criteria may include one or more combinations of successful process operations that are evaluated as constituting a successful software process.

In addition to the software process success criteria, the request may also include process operation success criteria to determine the success or failure of different ones of the process operations.

The process operations may be scheduled to be performed serial to one another according to the process map (block 504). Although performed serially, the order and/or selection of process operations to be performed may depend on whether the ones of the process operations are performed successfully or not. For example, the process map may include an identity of different subsequent process operations depending on the success or failure of a previously performed process operation. Stated differently, a subsequent process operation may be defined at the end of the currently pending process operation and may vary based on the success or failure of the currently pending process operation. In some embodiments, the software process is complete when no subsequent process operations are identified.

Figure 7:
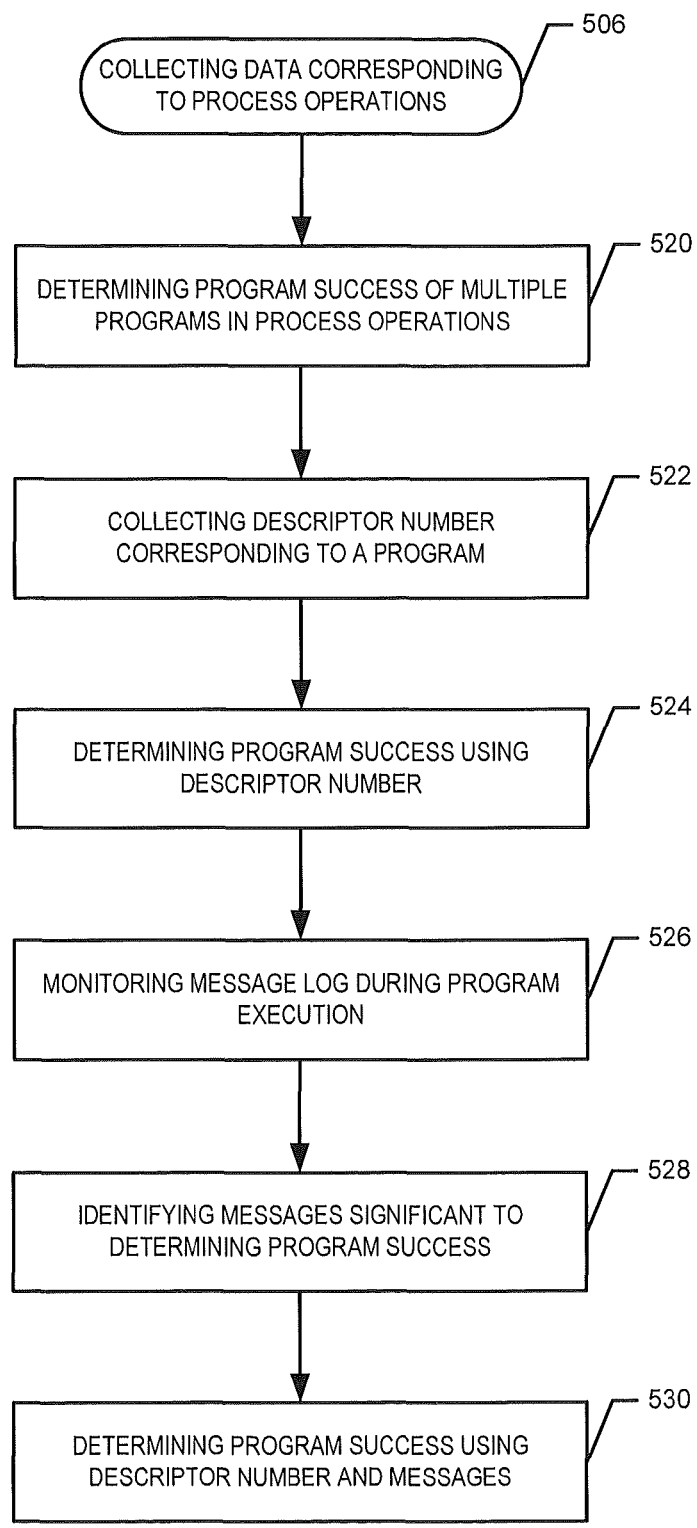
FIG. 7 is a flowchart illustrating operations for systems/methods according to embodiments of the present inventive subject matter.

Data corresponding to results of the process operations is collected (block 506). Brief reference is now made to FIG. 7, which is a flowchart illustrating operations for systems/methods according to embodiments of the present inventive subject matter. In some embodiments, collecting the data may include determining program success of the programs corresponding to different ones of the process operations (block 520). Determining program success of the programs may include collecting a descriptor number corresponding to each of the programs (block 522). Some embodiments provide that the descriptor number is generated by the program after execution of the program is complete. In such embodiments, determining program success may include using the descriptor number to determine whether the program successfully executed (block 524).

Referring back to FIG. 6, whether the software process is a success or a failure may be defined by evaluating the results of the data and defining whether the ones of the process operations executed successfully based on the process operation criteria (block 508). Referring back to FIG. 7, determining program success of the programs includes monitoring, while the program is executing, a message log that is a repository for messages generated by the program (block 526). Using the message log, a message that is significant to determining program success may be identified (block 528). Some embodiments provide that more than one message may be significant for determining program success and may be identified. As such, whether the program successfully executed may be determined using the descriptor number and the message(s) that is(are) significant to determining program success (block 530).

In some embodiments, each of the messages includes a severity code that corresponds to a content of the message. In this regard, identifying the message(s) that is(are) significant to determining program success may be based on the severity code. Some embodiments provide that determining program success of the programs may also include evaluating one or more success conditions that correspond to the program to determine if any of the one or more success conditions is satisfied. In such embodiments, the program execution may be evaluated as successful if any one of the success conditions is satisfied.

Some embodiments provide that one or more of the programs may be executed during a portion of execution of another one of the programs in the corresponding process operation.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
   receiving a request to perform a software process that comprises a plurality of process operations, ones of the plurality of process operations using a plurality of software programs for execution, the request comprising:
      a process map that defines the plurality of process operations that include the plurality of software programs corresponding to the software process; and
      a process operation success criteria to determine success of ones of the plurality of process operations;
   scheduling the plurality of process operations to be performed one after another in a series according to the process map;
   collecting data corresponding to results of ones of the plurality of process operations; and
   after collecting the data, defining whether the software process is successful, wherein defining whether the software process is successful comprises:
      evaluating the results of the data corresponding to the ones of the plurality of process operations; and
      defining whether the ones of the plurality of process operations executed successfully based on the process operation success criteria; and
   evaluating a plurality of success conditions that correspond to the one of the plurality of software programs to determine whether any one of the plurality of success conditions is satisfied,
   wherein when any of the plurality of success conditions is satisfied, then the one of the plurality of software programs execution is evaluated as being successful, and
   wherein the plurality of software programs used by the plurality of process operations that perform the software process comprise components in a success path corresponding one of the plurality of process operations, and
   wherein the plurality of process operations that perform the software process comprise components in a success path corresponding to the software process.

2. The method according to claim 1, wherein the process map further comprises software process success criteria that defines a combination of successful ones of the plurality of process operations to determine that the software process is a success.

3. The method according to claim 1, wherein ones of the plurality of software programs are executed on a plurality of different distributed network nodes.

4. The method according to claim 1, wherein the process map identifies the ones of the plurality of software programs, defines success criteria corresponding to the software process, the success criteria comprising a combination of successful ones of the plurality of process operations that are evaluated as the success criteria corresponding to the software process.

5. The method according to claim 1, wherein one of the plurality of software programs in a corresponding process operation is executed during a portion of execution of another one of the plurality of software programs in the corresponding process operation.

6. The method according to claim 1, wherein collecting data corresponding to results of ones of the plurality of process operations comprises determining program success of the plurality of software programs corresponding to ones of the plurality of process operations.

7. The method according to claim 6, wherein determining program success of ones of the programs of the plurality of software programs comprises, for one of the plurality of software programs:
   collecting a descriptor number corresponding to one of the plurality of software programs, wherein the descriptor number is generated by the one of the plurality of software programs after execution of the one of the plurality of programs is complete; and
   determining, based on the descriptor number value, whether the one of the plurality of software programs successfully executed.

8. The method according to claim 7, wherein determining program success of ones of the software programs of the plurality of software programs further comprise, for the one of the plurality of software programs:
   monitoring, while the one of the plurality of software programs is executing, a message log that is a repository for messages generated by the one of the plurality of software programs;
   identifying, using the message log, a message that is informative regarding program success or program failure; and
   determining, using the descriptor number and the message that is informative regarding program success or program failure, whether the one of the plurality of software programs successfully executed.

9. The method according to claim 8, wherein each of the messages includes a severity code that corresponds to a content of the message,
   wherein identifying the message that is informative regarding program success or program failure is based on the severity code.

10. The method according to claim 1, further comprising serially executing ones of the plurality of process operations, wherein which of the plurality of process operations is selected as a subsequent process operation is determined by whether a currently executing process operation is successful.

11. The method according to claim 10, wherein the process map includes an identity of which process operation is the subsequent operation based on whether the currently executing process operation is successful.

12. The method according to claim 10, wherein the software process is complete when no process operations subsequent to a currently executing process operation are identified.

13. A computer program product comprising:
   a computer readable storage medium having computer readable program code embodied in the medium, the computer code comprising:
   computer readable code to receive a request to perform a software process that comprises a plurality of process operations, ones of which comprise a plurality of software programs, the request comprising process operation success criteria to determine success of ones of the plurality of process operations;
   computer readable code to collect data corresponding to results of ones of the plurality of process operations; and
   computer readable code to define whether the software process is successful, the computer readable code to define whether the software process is successful to evaluate the results of the data and define whether ones of the plurality of process operations executed successfully based on the process operation criteria,
   wherein ones of the plurality of process operations are executed on a plurality of different distributed network nodes,
   wherein the plurality of software programs used by the plurality of process operations that perform the software process comprise components in a success path corresponding one of the plurality of process operations, and
   wherein the plurality of process operations that perform the software process comprise components in a success path corresponding to the software process.

14. The computer program product of claim 13,
   wherein the request to perform the software process further comprises a process map that defines a serial sequence in which the plurality of process operations are performed and software process success criteria that defines which ones of the plurality of process operations are performed successfully to determine that the software process is successful.

15. The computer program product of claim 13, wherein the computer readable code to collect data corresponding to results of ones of the plurality of process operations comprises computer readable program code to collect data corresponding to results of ones of the plurality of software programs, and
   further comprising computer readable program code to determine program success of the plurality of software programs corresponding to ones of the plurality of process operations.

16. The computer program product of claim 15, wherein the computer readable program code to determine program success of the plurality of software programs corresponding to ones of the plurality of process operations comprises:
   computer readable program code to collect a descriptor number corresponding to one of the software programs of the plurality of software programs, wherein the descriptor number is generated by the software program after execution of the software program is complete; and
   computer readable program code to determine, using the descriptor number, whether the software program successfully executed.

17. The computer program product of claim 16, wherein the computer readable program code to determine program success of the plurality of software programs corresponding to ones of the plurality of process operations further comprises:
   computer readable program code to monitor, while the program is executing, a message log that is a repository for messages generated by the software program;
   computer readable program code to identify, using the message log, a message that is informative regarding program success or program failure; and
   computer readable program code to determine, using the descriptor number and the message that is informative regarding program success or program failure, whether the software program successfully executed.

18. The computer program product of claim 17, wherein each of the messages includes a severity code that corresponds to a content of the message,
   wherein the computer readable program code to identify the message that is informative regarding program success or program failure uses the severity code.

19. The computer program product of claim 16, wherein computer readable program code to determine whether the software program successfully executed comprises:
    computer readable program code evaluate a plurality of success conditions that correspond to the software program to determine if any one of the plurality of success conditions is satisfied,
    wherein if any of the plurality of success conditions is satisfied, then the program execution is successful.

20. The computer program product of claim 15, wherein one of the plurality of software programs in a corresponding process operation is executed during a portion of execution of another one of the plurality of software programs in the corresponding process operation.

21. The computer program product of claim 14, further comprising computer readable code to executing ones of the plurality of process operations one after another in a series according to the process map, wherein which of the plurality of process operations is selected as a subsequent process operation is determined by whether a currently executing process operation is successful.

22. The computer program product of claim 13, wherein the software process is complete when no process operations subsequent to a currently executing process operation are identified.

23. A computer system, comprising:
    a processor; and
    a memory coupled to the processor, the memory comprising computer readable program code embodied therein that, when executed by the processor, causes the processor to:
    receive a request to perform a software process that comprises a plurality of process operations, ones of the plurality of process operations using a plurality of software programs for execution, the request comprising:
        a process map that defines the plurality of process operations corresponding to the software process; and
        a process operation success criteria to determine success of ones of the plurality of process operations;
    schedule the plurality of process operations to be performed one after another in a series according to the process map;
    collect data corresponding to results of ones of the plurality of process operations; and
    after collecting the data, define whether the software process is successful, wherein defining whether the software process is successful comprises:
    evaluating the results of the data; and
    defining whether the ones of the plurality of process operations executed successfully based on the process operation criteria,
    evaluating a plurality of success conditions that correspond to the one of the plurality of software programs to determine whether any one of the plurality of success conditions is satisfied,
    wherein when any of the plurality of success conditions is satisfied, then the one of the plurality of software programs execution is evaluated as being successful,
    wherein the plurality of software programs used by the plurality of process operations that perform the software process comprise components in a success path corresponding one of the plurality of process operations, and
    wherein the plurality of process operations that perform the software process comprise components in a success path corresponding to the software process.

24. The computer system of claim 23, wherein the process map further includes software process success criteria that defines at least one combination of successful ones of the process operations to determine that the software application is a success.

25. The computer system of claim 23, wherein the process map identifies the ones of the plurality of software programs, defines success criteria corresponding to the software process, the success criteria including a combination of successful ones of the process operations that are evaluated as the success criteria corresponding to the software process.

26. The computer system of claim 23, wherein the computer readable program code causes the processor to:
    determine program success of the plurality of software programs corresponding to ones of the plurality of process operations;
    collect a descriptor number corresponding to the software program, wherein the descriptor number is generated by the software program after execution of the software program is complete; and
    determine, using the descriptor number, whether the software program successfully executed.

27. The computer system of claim 26, wherein the computer readable program code causes the processor to:
    monitor, while the software program is executing, a message log that is a repository for messages generated by the software program;
    identify, using the message log, a message that is informative regarding program success or program failure; and
    determine, using the descriptor number and the message that is informative regarding program success or program failure, whether the software program successfully executed.

* * * * *